US007979197B2

(12) United States Patent
Finn et al.

(10) Patent No.: US 7,979,197 B2
(45) Date of Patent: Jul. 12, 2011

(54) AIRPORT TRAFFIC MANAGEMENT

(75) Inventors: Peter G. Finn, Brampton (CA); Carl P. Gusler, Austin, TX (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 831 days.

(21) Appl. No.: 11/952,241

(22) Filed: Dec. 7, 2007

(65) Prior Publication Data

US 2009/0150013 A1 Jun. 11, 2009

(51) Int. Cl.
*G06F 19/00* (2006.01)

(52) U.S. Cl. .......................................................... 701/117

(58) Field of Classification Search .......... 701/1, 15–16, 701/120–121, 204, 207, 300–301; 340/435, 340/642, 933, 947, 951, 953, 955
See application file for complete search history.

(56) References Cited

U.S. PATENT DOCUMENTS

| | | | |
|---|---|---|---|
| 5,202,690 A | 4/1993 | Frederick | |
| 5,288,163 A | 2/1994 | Munson | |
| 5,334,982 A | 8/1994 | Owen | |
| 5,400,031 A | 3/1995 | Fitts | |
| 5,714,948 A | 2/1998 | Farmakis et al. | |
| 6,182,005 B1 | 1/2001 | Pilley et al. | |
| 6,246,342 B1 | 6/2001 | Vandevoorde et al. | |
| 6,438,469 B1 | 8/2002 | Dwyer et al. | |
| 6,694,249 B1 | 2/2004 | Anderson et al. | |
| 2003/0074128 A1 | 4/2003 | Mardirossian | |
| 2008/0157947 A1* | 7/2008 | Hutton | 340/435 |

FOREIGN PATENT DOCUMENTS

EP 0739493 A1 10/1996

OTHER PUBLICATIONS

"The Increasing Number of Mishaps on our Nation's Runways", Committee on Transportation and Infrastructure, Nov. 13,1997, 58 Sheets, http://www.house.gov/transportation.
Katz, "Evaluation of a Prototype Advanced Taxiway Guidance System (ATGS)", Tech Note, U.S. Department of Transportation, Federal Aviation Administration, Feb. 2000, 18 sheets.
NTSB "Most Wanted Transportation Safety Improvements Federal Issues", Nov. 2006 (with updates as of Jul. 2007), 3 Sheets.

(Continued)

*Primary Examiner* — Kim T Nguyen
(74) *Attorney, Agent, or Firm* — Patrick J. Daugherty; Driggs, Hogg, Daugherty & Del Zoppo Co., LPA

(57) ABSTRACT

Airport ground traffic management methods, program products and systems provided for a plurality of tags or tag readers distributed throughout an airport each spaced greater than a tag reader scanning distance. A traveling apparatus brings a tag proximate to a tag reader and a traffic manager in communication with the tag reader receives tag data and determines an apparatus location characteristic and formats the characteristic into a presentation provided to an apparatus operator or an airport ground traffic controller. Campus regions are identified in response to an airport campus function characteristic, and an apparatus location is plotted within a region on a graphic representation. In response to location, speed, historic data, data from other read tag and the location of another apparatus, a determined course of action is determined including entering a movement directive into an autopilot component.

22 Claims, 4 Drawing Sheets

OTHER PUBLICATIONS

Morton "Airport Safety/Capacity Enhancement", Raytheon Company: Products & Services: Airport Enhancement, Copyright 2003-2007, 2 sheets, Raytheon Company, (www.raytheon.com/products/amhs/airport/).

"Radar Surveillance—Surface Movement Radar System in Chinese Airport" Terma—Defense, aerospace, radar, space, ATM and IT-solutions, downloaded form internet, Aug. 23, 2007, 3 sheets, www.terma.com/print.dps?page=252.

* cited by examiner

AIRPORT TRAFFIC MANAGEMENT

FIELD OF THE INVENTION

The present invention generally relates to utilizing pluralities of unique aircraft or airport location identifiers in the management of airport ground traffic, and more particularly to methods, systems, and program products for the comprehensive orchestrating of airport ground traffic. It is also amenable to other applications in which it is desirable to automatically and passively identify unique airplane, ground vehicles or airport ground elements.

BACKGROUND OF THE INVENTION

Airports must manage the movement of a wide variety of apparatuses along the ground throughout an airport campus, for example including aircraft such as airplanes, gliders and helicopters, as well as ground vehicles such as automobiles, trucks, baggage carts, and fire suppression equipment. Effective and safe orchestration of airport ground traffic is critical in preventing aircraft collisions and other accidents. Large losses of life have occurred in airplane collisions caused by airplanes taking wrong turns while taxiing and into the path of another airplane, or by taking-off from the wrong runway and into another airplane. Collisions may be caused by many factors, but commonly at least one pilot is mistaken as to his airplane location relative to an actual approved runway or airport ground location. Moreover, when such a mistake occurs airport ground traffic controllers are usually not aware of the actual locations or destinations of the colliding planes and/or are unable to timely issue instructions to the involved pilots to thereby enable them to avert a collision.

It is proposed to incorporate ground microwave or radar devices in airports in order to enable detection and tracking of ground traffic. However, proposed approaches generally require a plurality of expensive radar or microwave devices, and even then due to high costs and other factors only enough devices are proposed to provide limited airport area coverage, typically at runway entrance points. Moreover, such ground radar systems are generally configured to provide airplane location information only to the airport ground controllers, not to aircraft pilots or vehicle drivers, each of which retains significant responsibility for decisions about aircraft movement at the airport.

Moreover, ground radar systems may not identify aircraft or vehicles with specificity, or they may not effectively distinguish between one or a plurality of individual aircraft or vehicles located in close proximity to each other, thus resulting in misreporting or omission of aircraft and vehicle presence event reporting. And they are not generally configured to determine a forward orientation of a detected aircraft or vehicle and are thus unable to provide notice as to whether an aircraft or vehicle is pointed in a correct direction for safe forward movement. Thus additional information is generally required to augment ground radar system observations, generally through constant visual scanning of affected areas and/or continuous tracking of aircraft and vehicle identity and movements by air traffic controllers or even pilots. And a mistake or lapse by a pilot or controller in acquiring or processing such additional information may fatally compromise ground radar traffic monitoring.

Other ground control systems have been proposed that use global positioning satellite (GPS) transponders located in airplanes in order to enable pilots to correctly locate their airplanes relative to the GPS coordinates of specific runways and other airport areas. However, the use of GPS systems is dependent upon interoperation with third-party satellite systems, as well as ascertaining and deploying detailed airport GPS mappings to airplanes and aircraft systems worldwide, and maintaining airport GPS mappings current in response to any construction projects or other revisions. Thus installation, maintenance, reliability and management costs and issues appear problematic in successfully deploying such GPS systems. Furthermore, such proposed GPS systems are limited to individual aircraft and thus provide little meaningful additional information to airport controllers, who retain significant responsibility for decisions about aircraft movement at the airport.

SUMMARY OF THE INVENTION

Methods program products and systems are provided for managing ground traffic in an airport. In one aspect a method comprises distributing a spaced plurality of tags or tag readers throughout an airport campus, the tag readers configured to read data from each of the tags located within a tag reader scanning distance, each of the distributed plurality of tags or tag readers spaced from adjacent tags or tag readers at least a spacing distance greater than the tag reader scanning distance. An apparatus traveling through the airport campus brings either: an attached tag reader proximate to an airport campus area tag within the tag reader scanning distance, or an attached tag proximate to a campus area tag reader within the tag reader scanning distance. The tag reader reads tag data from the proximate tag and a traffic manager in communication with the tag reader receives the tag data and determines an airport campus location characteristic for the apparatus. The traffic manager also formats the airport campus location characteristic into a presentation and provides the presentation to an apparatus operator or an airport ground traffic controller.

In another method primary and secondary airport campus regions are identified in response to an airport campus function characteristic, and primary regional and secondary regional pluralities of the distributed airport campus tags or tag readers are spaced by divergent regional spacing dimensions. Determining an airport campus location characteristic thus comprises identifying an associated one of the primary and the secondary airport campus regions in response to the read tag data.

In another method formatting a presentation comprises constructing a graphic representation of the airport campus comprising a plurality of campus location points, each point correlated to at least one of the distributed plurality of tags or tag readers. The graphic representation comprises a first graphic area visually representative of the primary region and a second graphic area visually representative of the secondary region and visually distinctive from the first region graphic area. An apparatus location is plotted on the airport campus graphic representation within the first graphic area or the second graphic area and proximate to a first campus location point correlated with the read tag data.

In one method determining the airport campus location characteristic comprises processing historic data read from the tag or other tag data read from another tag. In another method the traffic manager issues a unique directive to the apparatus operator or the airport ground traffic controller in response to unique tag data read from the first tag by the first tag reader, the unique tag data is divergent from tag data encoded in a tag adjacent to the read tag. And in one method the tags are RFID tags and the tag readers are RFID tag readers.

In one method a traffic manager determines a course of action for the apparatus in response to the determined airport campus location characteristic and to at least one of the group comprising a determined speed of the apparatus, the historic read data, the other tag read data and a determined location of another apparatus within the airport campus. The traffic manager also provides a ground traffic control directive to the apparatus operator or the airport ground traffic controller in response to the determined course of action. And in another method providing the ground traffic control directive comprises entering an apparatus movement directive into an apparatus auto-pilot control component, the auto-pilot component causing movement of the apparatus in response to the apparatus movement directive.

In another aspect a method is provided for producing computer executable program code, storing the produced program code on a computer readable medium, and providing the program code to be deployed to and executed on a computer system, for example by a service provider who offers to implement, deploy, and/or perform functions for others. Still further, an article of manufacture comprising a computer usable medium having the computer readable program embodied in said medium may be provided. The program code and/or computer readable program comprise instructions which, when executed on the computer system, cause the computer system to receive tag data read from a first tag by a first tag reader; determine an airport campus location characteristic for an apparatus traveling through the airport campus from the read data; format the airport campus location characteristic into a presentation; and provide the presentation to an apparatus operator or an airport ground traffic controller. More particularly, a spaced plurality of the tags or the tag readers are distributed throughout the airport campus, the tag readers configured to read data from each of the tags located within a tag reader scanning distance, each of the distributed plurality of tags or tag readers spaced from adjacent tags or tag readers at least a spacing distance greater than the tag reader scanning distance. The read tag data is provided by the apparatus through either bringing an attached tag reader proximate to one of the distributed airport campus area tags within the tag reader scanning distance, or through bringing an attached tag proximate to a distributed airport campus tag reader within the tag reader scanning distance.

In another aspect a computer infrastructure is further operable to format the presentation by constructing a graphic representation of the airport campus comprising a plurality of campus location points correlated to the distributed plurality of campus tags or tag readers, the graphic representation comprising a first graphic area visually representative of a primary region and a second graphic area visually representative of a secondary region and visually distinctive relative to the first region graphic area. An apparatus location is also plotted on the airport campus graphic representation within the first graphic area or the second graphic area and proximate to a first campus location point correlated with the read tag data.

In one aspect a computer infrastructure is further operable to issue a unique directive to an apparatus operator or an airport ground traffic controller in response to unique tag data read from a first tag and divergent from tag data encoded in a tag adjacent to the read tag. Another computer infrastructure is operable to determine a course of action for an apparatus in response to read tag data and historic read tag data, other tag data read from another tag, a determined speed of the apparatus and/or a determined location of another apparatus within the airport campus and provide a responsive ground traffic control directive. And another computer infrastructure is operable to enter a ground traffic control directive directly into an apparatus auto-pilot control component.

In another aspect a system is provided comprising a processing means configured to receive tag data read from a tag by a tag reader; a spaced plurality of tags or tag readers distributed throughout an airport ground campus, the tag readers in communication with the processing means and configured to read data from each of the tags located within a tag reader scanning distance, each of the distributed plurality of tags or tag readers spaced from adjacent tags or tag readers at least a spacing distance greater than the tag reader scanning distance; and an apparatus tag or tag reader deployed on an apparatus. Travel of the apparatus along the ground campus brings either an apparatus tag reader proximate to one distributed airport campus area tags within the tag reader scanning distance, or an apparatus tag proximate to one of the distributed airport campus area tag readers within the tag reader scanning distance. The processing means is configured to determine an airport campus location characteristic for the apparatus relative to the airport campus from data read from the tag by the proximate tag reader, format the airport campus location characteristic into a presentation, and provide the presentation to an apparatus operator or an airport ground traffic controller.

In one system a processing means determines an airport campus location characteristic by identifying an associated one of primary and secondary airport campus regions in response to the read tag data. Each of a primary regional plurality of distributed airport campus tags or tag readers are deployed throughout the primary region in a first regional distribution array by spacing each from an adjacent other by a first regional spacing dimension. And each of a secondary regional plurality of distributed airport campus tags or tag readers are deployed throughout the secondary region in a secondary regional distribution array by spacing each from an adjacent other by a second regional spacing dimension greater than the first regional spacing dimension.

In another system a processing means is configured to format a presentation by constructing a graphic representation of the airport campus comprising a plurality of campus location points correlated distributed tag or tag readers and comprising a visually distinctive first and second graphic areas visually representative of respective primary and secondary regions. The processing means is configured to plot an apparatus location on the airport campus graphic representation within the first or second graphic area and proximate to a first campus location point correlated with the read tag data.

In some systems the tags are RFID tags, and the tag readers are RFID tag readers. In one system the processing means is further configured to determine a course of action for the apparatus in response to the read tag data and historic read tag data, other tag data read from another tag, a determined speed of the apparatus and/or a determined location of another apparatus within the airport campus, further to provide a ground traffic control directive in response to the determined course of action. And in another system a ground traffic control directive is an apparatus movement directive, the processing means further configured to enter the apparatus movement directive directly into an apparatus auto-pilot control component.

BRIEF DESCRIPTION OF THE DRAWINGS

These and other features of this invention will be more readily understood from the following detailed description of the various aspects of the invention taken in conjunction with the accompanying drawings in which.

Figure 1:
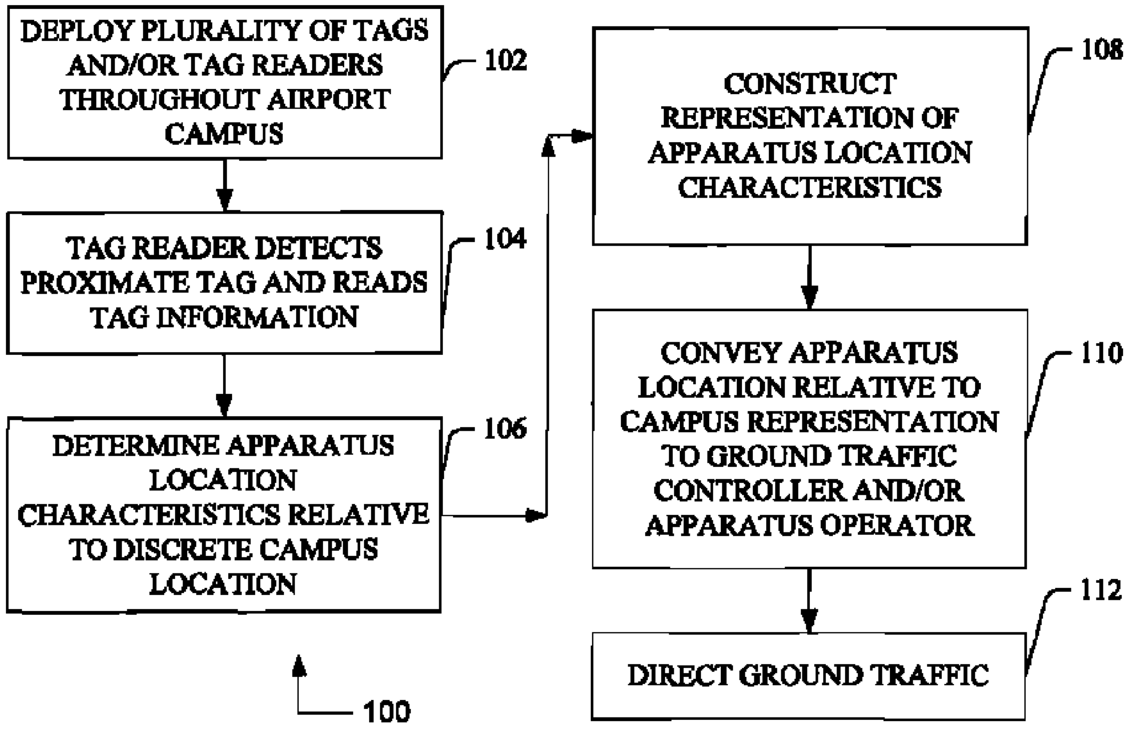
FIG. 1 is a high-level illustration of a method and system for management of airport ground traffic.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections I. General Description II. Computerized Implementation I. General Description FIG. 1 illustrates a process and system 100 for management of airport ground traffic. At 102 a plurality of unique tags and/or tag readers are deployed throughout an airport campus, and more particularly throughout ground traffic areas of an airport used by or related to the movement of aircraft and vehicles on the ground. At 104 a detection and identification event occurs: examples include at least one deployed campus tag reader detecting a proximate tag attached to an apparatus traveling along the ground at the airport (for example, an aircraft or ground vehicle) and reading specific apparatus information embedded in the tag; an apparatus tag reader detecting at least one proximate tag of a deployed plurality of airport campus tags and reading specific campus location information embedded in the at least one proximate tag; and a combination of both a deployed campus tag reader detecting and reading an apparatus tag and an apparatus tag reader detecting and reading a deployed airport campus tag.

At 106 the detection event is analyzed and location characteristics of the apparatus relative to one or more discrete campus locations associated with the one or more of the plurality of campus tags and/or tag readers and/or the airport campus are determined. At 108 the determined location characteristics are constructed into one or more presentations appropriate for conveying desired information to an airport ground traffic controller, the apparatus operator, and/or both. At 110 one or more location characteristic presentations are conveyed to the airport ground traffic controller, or apparatus operator, and/or both, wherein the information conveyed is selected to enable appropriate ground navigation of the identified apparatus by the airport ground traffic controller or apparatus operator, or both. An optional process is provided at 112 wherein a ground traffic control component or system receives inputs from one or more of the processes of 104 through 110 and provides ground traffic control directives, sometimes taking direct control or an apparatus through automated means such as auto-pilot control systems.

Figure 2:
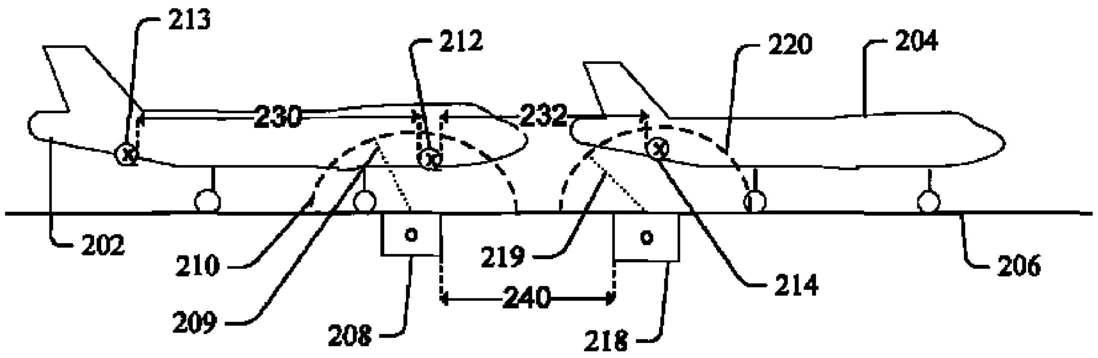
FIG. 2 is a side perspective view illustrating aircraft and an airport campus area incorporating ground traffic management components.

In one example illustrated in FIG. 2 tag readers 208 and 218 are embedded into a runway surface 206. Each of the tag readers 208 and 218 is configured to read the tag 212,213 and 214 when they are within respective threshold proximity distances 209 and 219. Thus reader 208 is configured to read tags 212, 213 or 214 when each is within a semicircular detection region 210 defined by a proximity distance threshold radius 209, and reader 218 is configured to read tags 212, 213 or 214 when each is within semicircular detection region 220 defined by a proximity distance threshold radius 219. Accordingly, as positioned in FIG. 2 reader 208 reads only forward tag 212 of aircraft 202, presently within its detection region 210, and reader 218 reads only rear tag 214 of aircraft 204, presently within its detection region 220.

Some embodiments may provide additional advantages by configuring a tag reader to read tags only within a proximity distance threshold less than anticipated spacings between adjacent tags. Thus referring again to FIG. 2, in one embodiment if the spacing dimension 230 between aircraft 202 forward tag 212 and rear tag 213 and the spacing dimension 232 between aircraft 202 forward tag 212 and aircraft 204 rear tag 214 are each greater than either threshold proximity distance 209 or 219, then each reader 208 and 218 will read no more than one tag 212, 213 or 214 at any given time as an aircraft 202 or 204 travels along the ground. This enables each reader 208 and 218 to report, in real time, information from only one of the specific aircraft tags 212, 213 or 214 at any given time, thus providing additional assurance of correct aircraft identification. However, it is to be understood that the range of each tag reader may vary greatly as deemed necessary for any particular location or other system requirement, and thus other embodiments and tag/tag reader spacing configurations may provide that tag readers may read more than one tag present within a given reader detection area simultaneously.

Figure 3:
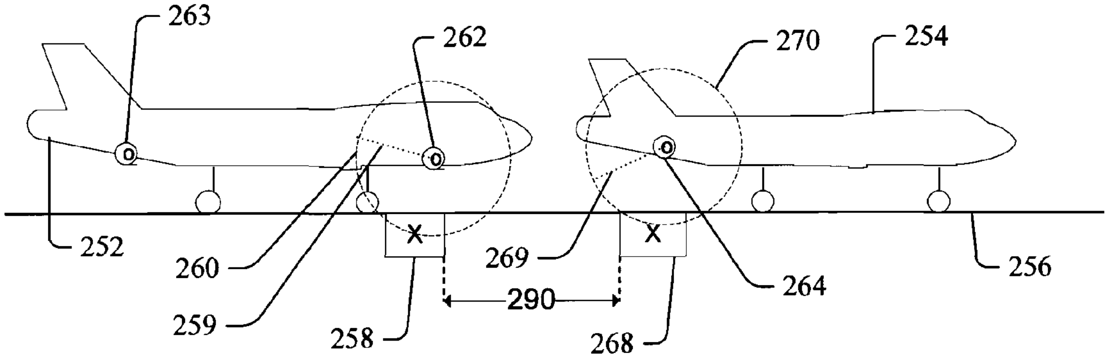
FIG. 3 is a side perspective view illustrating aircraft and an airport campus area incorporating ground traffic management components.

In an alternative example illustrated in FIG. 3, aircraft tag readers 262 and 263 (located on aircraft 252) and 264 (located on aircraft 254) are configured to read tags 258 and 268 embedded into a runway surface 256 when they are within respective threshold proximity distances 259 and 269, and thus when each is within detection region 260 defined by proximity distance threshold radius 259 and detection region 270 defined by proximity distance threshold radius 269. And again, additional advantages may be provided by configuring the tag readers 262,263,264 to read tags located within proximity distance thresholds 259,269 less than anticipated tag location spacings 290, enabling each tag reader 262,263,264 to report, in real time, information from only one of the specific runway tags 258,268 at any given time, thus providing additional assurance of correct runway tag location information inputs relative to actual apparatus positioning. However, it is to be understood that the range of each tag reader may vary greatly as deemed necessary for any particular location or other system requirement, and thus other embodiments and tag/tag reader spacing configurations may provide that tag readers may read more than one airport campus tag present within a given reader detection area simultaneously.

In some examples the tags 212,213,214,258,268 are radio frequency identification (RFID) tags and the tag readers 208, 218,262,263,264 are RFID tag readers or transceivers. RFID components provide advantages over prior art ground control systems (for example over ground radar and GPS systems) as generally providing for lower component, installation, power and maintenance costs. However, it is to be understood that other embodiments may utilize other tag and tag reader components and technology: examples of alternates include Bluetooth, WiFi, WIMAX, Near Field Communications (NFC), Zigbee, and RuBee components and technology, and other alternative sensor and/or unique identifier components and technology appropriate to practice the present invention(s) will be apparent to one skilled in the art.

Distributing a plurality of tags or tag readers through individual discrete airport campus locations enables corresponding plurality of individual and simultaneous tag reading and reporting events, where each reader need report only one tag reading event. This reduces or even eliminates the apparatus confusion, omission or mistaken aggregation that may occur with prior art systems that require a detection component to detect multiple apparatuses. For example, a prior art ground radar system radar component may scan an area and misreport a plurality of small apparatuses proximate to each other as one large apparatus profile, or it may miss an apparatus when emitted radar waves are physically impeded by one or more intervening apparatuses or other structures.

Figure 4:
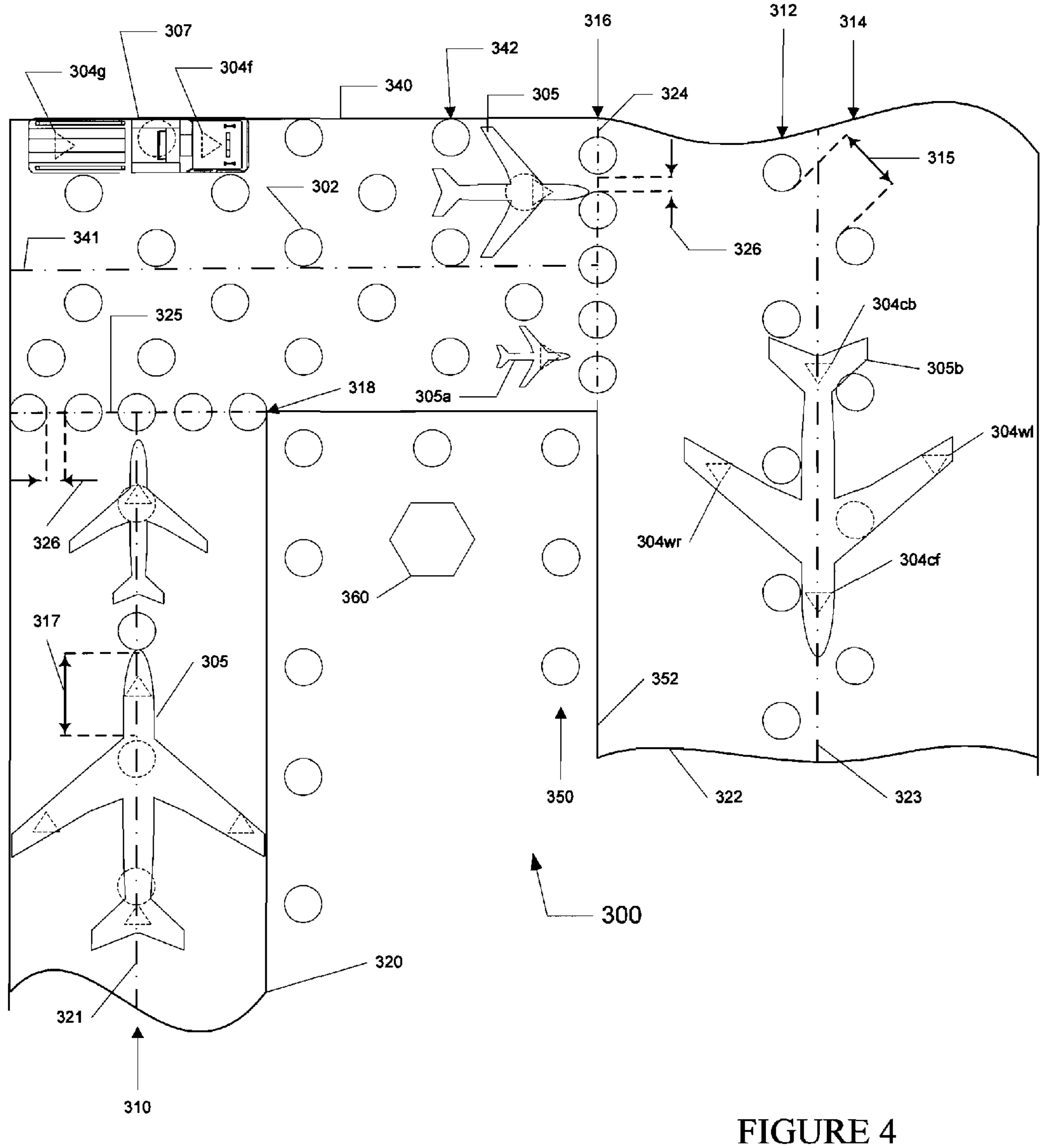
FIG. 4 is a top perspective view illustrating an airport campus area incorporating ground traffic management components.

FIG. 4 illustrates one embodiment wherein a plurality of tag readers or transceivers 302 are distributed within an airport campus 300, the readers 302 configured to read tags 304 attached to aircraft 305 and vehicle 307 traveling along the ground surfaces. Readers 302 may be installed in recessed housings, so that they can "scan" aircraft 305 and vehicles 307 and read their tags 304 but are not vulnerable to being "run over" by aircraft tires, though other installation configurations may also be practiced. In one embodiment each aircraft 305 or vehicle 307 is provided with at least one unique passive RFID tag 304. In one embodiment each aircraft RFID tag 304 is coded with the unique "tail number" conventionally assigned to each aircraft 305 and also painted on the aircraft for visual identification and use as a unique international identifier. Aircraft may be fitted with the tags 304 at manufacture, during maintenance work, or as part of a mandatory process before being allowed to navigate on the ground at or to depart from an airport configured with tag sensors 302 or though some other requirement (for example, before departing from an airport having a specified size or service threshold); other examples will be apparent to one skilled in the art.

The number and/or distribution of tags or tag readers throughout an airport campus may be selected in response to one or more characteristics. In the example illustrated in FIG. 4 a linear plurality 310 of readers 302 is provided along taxiway 320 centerline 321, each configured to scan for traveling aircraft or vehicle-mounted tags 304. As airport ground traffic rules conventionally require that all apparatuses traveling upon a taxiway 320 to navigate along its centerline 321, it is anticipated each apparatus 305,307 have at least one centrally biased tag (for example, tags 304*f* and 304*g* on fire truck 307 and front tag 304*cf* on the large aircraft 305*b*) which the centerline array 310 readers 302 are configured to read, and thus the centerline array 310 may provide comprehensive coverage of all taxiway 320 traffic without the need for installing other readers in outer taxiway 320 areas. Larger runway 322 comprises an alternative arrangement of two alternating, parallel linear reader arrays 312 and 314 spaced about and offset from the runway centerline 323, with adjacent readers 302 spaced a spacing distance 315. The offset arrangement of arrays 312 and 314 helps enable the runway arrays 312,314 to read apparatus tags 304 even if the aircraft or vehicles deviate from a centerline 323 alignment, and also to detect aircraft 305 or vehicles 307 whose movements need to be tracked and yet which might not follow the centerline 323.

Linear reader arrays 316 and 318 are provided at the runway 322 and taxiway 320 transitional or egress/entry areas 324 and 325, respectively. These transitional area arrays 316, 318 comprise a denser distribution of readers 302 relative to the runway and taxiway centerline arrays 310, 312 and 314. As detection of movement of aircraft or vehicles through transitional areas 324 and 325 is generally especially important in avoiding collisions, the transitional area array 316,318 distributions are selected to provide more comprehensive coverage through smaller spacing dimensions 326 relative to the runway reader spacings 315 or the taxiway reader spacings 317, thus proportionately increasing the likelihood that that a transitional area array 316,318 reader 302 will detecting an entering or exiting vehicle 307 or aircraft 305.

Holding area 340 reader array 342 also provides for a more comprehensive area coverage relative to the centerline-biased taxiway and runway arrays 310, 312 and 314, as holding area apparatus distributions are conventionally independent of any holding area centerline 341 orientation and may include smaller aircraft 305*a* and/or ground vehicles 307 distal from a centerline 341 and positioned toward outside edges 352. Readers 302 may also be provided in edge array 350 distributions to monitor for aircraft 305 or vehicles 307 that may stray from the taxiway and runway centerlines 321,323 or travel over runway, taxiway or holding area edges 352.

Each aircraft 305 and vehicle 307 may also be fitted with a plurality of tags 304. This enables back-up detection if one or more tags 304 fail and become undetectable. Larger aircraft 305*b* may be fitted with a spaced plurality of tags 304 to ensure that at least one part of the large aircraft 305*b* has proximity to a relevant tag reader 302. Multiple tag installations also enable more specific information retrieval relative to apparatus positioning: for example a scanned right wing tag 304*wr* may be used to more comprehensively locate the aircraft 305*b* footprint relative to a current or past reading of one or more of its other tags 304*wl*, 304*cf* and 304*cb*.

Non-aircraft airport ground vehicles 307 may also be fitted with one or more unique tags 304*f* so that their presence and movements can also be detected, plotted, predicted, and/or accounted for: for example, a reading of tag 304*f* may provide "Fire Truck 734 front tag" identity information, and the speed and/or orientation of the vehicle may be ascertained by historical readings of the same tag 304*f* and/or current or historical readings of another vehicle 307 tag 304*g*. Illustrative but not exhaustive examples of other airport ground vehicles 307 include airport baggage carts, service trucks, airport security vehicles.

Additional types of sensors 360 may also be utilized to provide back-up or additional aircraft and vehicle positional information, in some embodiments acting as a "fail-safe" measure to detect moving aircraft 305 or vehicles 307 which fail to "check in" with a tag reader 302. Illustrative but not exhaustive sensor 360 examples include optical sensors, magnetic detectors, weight sensors, motion detectors, sound detectors, small "spotlight" radars and proximity detectors; other components and systems will be apparent to one skilled in the art.

Figure 5:
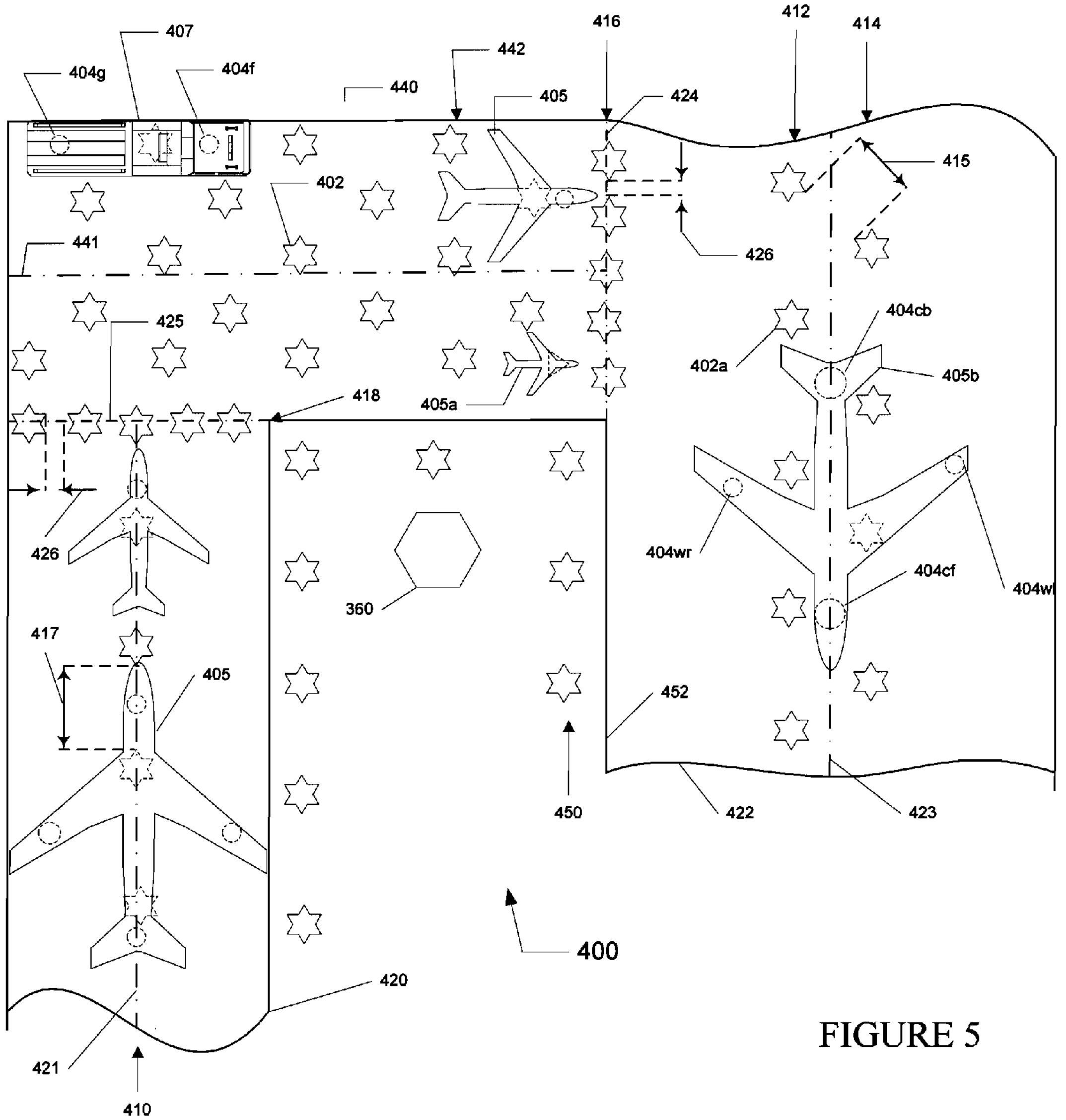
FIG. 5 is a top perspective view illustrating an airport campus area incorporating ground traffic management components.

In another example depicted in FIG. 5 aircraft 405 and vehicles 407 are equipped with one or more tag readers 404 capable of reading tags 402 distributed within an airport campus 400, each located at and associated with a designated airport campus point. The tags 402 are each uniquely encoded with positional information and embedded into paved surface areas on which aircraft are likely to traverse including a runway 422, taxiway 420 and holding area 440, or are otherwise fixed into a position in those areas that enable scanning by passing tag readers 404. In one example tag 402*a* is encoded with unique positional information ("Runway 10L/190R-1250 feet south of runway foot"), and thus aircraft 405*b* reader 404*cb* can read and report this information as positional data upon traveling over the tag 402*a*. However, it will be appreciated that other areas, for example hangers and fire stations (not shown) may also incorporate tags 402.

As discussed above with respect to the plurality of readers 302 illustrated in FIG. 4, airport campus tag 402 information and distribution may be dependent upon associated area characteristics. Accordingly, transitional or egress/entry areas 424 and 425 provide denser linear tag arrays 416 and 418 with smaller tag spacing distances 426 relative to runway and taxiway centerline array 410, 412 and 414 spacing dimensions 417 and 415. And holding area 440 reader array 442 also provides for a more comprehensive area coverage relative to the centerline-biased taxiway and runway arrays 410, 412 and 414, as holding area apparatus distributions are conventionally independent of any holding area centerline 441 orientation and may include smaller aircraft 405*a* and/or ground vehicles 407 distal from a centerline 441 and positioned toward outside edges 452.

Airport campus tags 402 may comprise special apparatus operator information appropriate to an associated location. Thus runway and taxiway threshold array 416 and 418 tags 402 may provide notification information to be conveyed to a pilot, vehicle driver or airport traffic controller, for example informing a pilot that he must stop and request clearance before crossing or proceeding beyond a position correlated with a read linear array 416 or 418 tag 402. Edge arrays 450 of tags 402 proximate to edges 452 may thus also provide edge location notifications or warnings, which may be particularly useful to apparatus operators in poor visibility conditions (for example in dense fog conditions), as well as helping to ensure that apparatuses 405,407 not traveling down centerlines 421 or 423 will read an edge array 450 tag 402 and receive location information there from.

As discussed above aircraft 405 conventionally travel over runways 422 and taxiways 420 along their respective centerlines 423,421, and thus at least one aircraft tag reader 404*cb* is centrally-disposed and configured to align with the centerline-biased tag arrays 410,412,414. Outboard tag readers 404*wr* and 404*wl*, in some examples located under wing landing gear or under wingtips, also enable reading of edge array 450 tags 402 (thus providing additional location information) as well as helping to ensure that the centerline array 410,412,414 tags 402 are read even if aircraft 405*b* is not traveling along a centerline 421 or 423.

Airport ground vehicles 407 may also be fitted with one or more tag readers 404*f* and 404*g* enabling them to also determine their locations with precision. And the additional sensors 360 may also be utilized to provide back-up or additional aircraft and vehicle positional information, either through direct communication with the tag readers 404 or through some other communication system, thus providing positional information back-up functions.

It will also be understood that pluralities of tags and tag readers may be combined or blended in alternative distributions. For example the elements 302 of FIG. 4 and/or the elements 402 of FIG. 5 may comprise alternating distributions of tags and tag readers, or combined tag and tag reader elements; and the apparatuses 305,307,405,407 may incorporate alternating distributions of tags and tag readers or combined tag and tag reader elements. Thus the present invention is not limited to the embodiments discussed above, which are described as exemplary applications.

Figure 6:
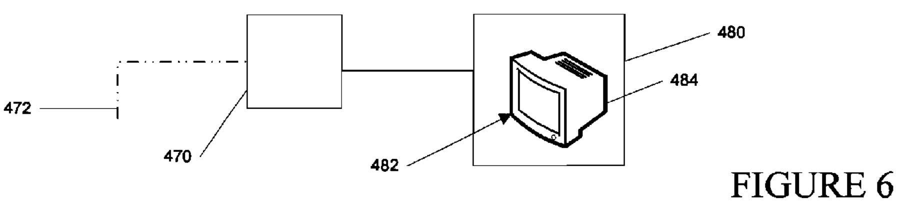
FIG. 6 illustrates an exemplary management system in communication with the elements of the airport campus ground traffic management components.

FIG. 6 illustrates a monitoring system 470 shown in a circuit communication 472 with one or more of the tag readers 208,218,262,263,264,302 and/or 404, and optionally with other sensors 360. The system 470 is configured to receive reader 302/404 and/or sensor 360 inputs and perform one or more of the process components 106, 108, 110 and 112 illustrated in FIG. 1. In one embodiment the system 470 tracks the positions and movement of aircraft 305/405 and/or vehicles 307/407 and provides reports or other data to a ground traffic control entity 480 such as an airport traffic control facility, and aircraft pilot and/or a vehicle operator.

Multiple levels of monitoring system 470 performances may be provided, for example selected in response to one or more characteristics such as system cost, airport sizes and/or campus complexities. In one example an aircraft equipped with an onboard navigation system 484 in communication with the monitoring system 470 is configured to inform pilots or autopilots of aircraft location relative to read tags, optionally by combining read tag information with other positional or navigational information (for example including instructions from ground controllers or ground control systems). In one embodiment a navigation system 484 converts incoming tag data into language text messages for the pilots: for example, "Cleveland-Hopkins International Airport, Runway 5L, Marker 7, Yard 35 Centerline, Long: 0.923257 W, Lat: 37.172737 N." Text may reflect real-time indications of apparatus location and movements (for example, "Waiting at South Threshold, Runway 10L/190R"; "Passing 1250 foot marker, Runway 10L/190R"), enabling an apparatus operator to confirm that his location is consistent with other information, such as verbal instructions from an airport ground controller or Wi-Fi signals from other airport ground control systems that may display positions and movements of other aircraft and vehicles.

The monitoring system 470 may be configured to determine apparatus direction and speed from tag inputs. For example, referring again to FIG. 2, by comparing tag reader 208 and 218 inputs to each other and/or to historical readings, the speed and direction of aircraft 202 may be easily and quickly (and optionally in real-time) determined. For example, if aircraft 202 proceeds forward until rear tag 213 is within the detection region 210 then a time of detection may be compared to an earlier time of detection reported by the same reader for forward tag 212, and if the spacing 230 between them is known then the forward speed of the aircraft 202 is easily calculated. In another example by observing the distance 240 between the readers 208 and 218 and relative detection times the speed that a given detected tag 212,213, 214 travels there between may also be calculated.

The monitoring system 470 may also be configured to assemble and present a graphic display depiction 482 of the airport campus 300/400 from tag reader 302/404 inputs (and optionally the sensor 360); in one example with individual icons representing each aircraft 305/405 and vehicle 307/407 plotted relative to campus reader 302 or tag 402 location icons. In one embodiment a navigational system 484 may present an airport campus 300/400 navigational map to an aircraft 305/405 pilot or vehicle 307/407 operator using preloaded airport maps, and also optionally using GPS navigational information for improved mapping information.

In some embodiments, campus reader 302 and/or tag 402 locations may be assembled into a graphic depiction of the airport campus 300/400. Plotting real-time apparatus locations on a graphic campus depiction enables pilots to see a full depiction of where they are in an overall airport campus 300/400, which is especially useful in poor visibility conditions at night or in bad weather. It may also help pilots to understand and interpret verbal or text routing instructions. Thus in one advantage pilots may react faster and better to unexpected or emergency conditions, especially when poor visibility may otherwise limit pilot performance.

An advantage of using distributive pluralities of tags 402 or tag readers 302 throughout an airport campus 300/400 is that a given distribution may correlate directly with a visual aspect and/or graphic representation of the respective campus 300/400. Thus displays of the reader arrays 310,312,314,316,318, 342,350 or the tag arrays 410,412,414,416,418,442,450 as physically distributed are each readily visually indicative of their respective runway, taxiway, holding area or edge area placement. Moreover, apparatuses may be plotted directly relative to a tag reader input, by one or more scanning readers 302 or read tags 402 to immediately convey an aircraft 305/405 location within an associated runway 322/422, taxiway 320/420, holding area 340/440 or edge area 352/452, thus in some embodiments enabling a graphic display 482 substantially similar to the illustrations provided by FIG. 4 or 5. Interpreting data inputs in presentations comprehensively in correlation with actual reader 302 or tag 402 distributions (and thus representative of a correlated campus layout 300 or 400) is greatly simplified, thereby reducing critical translation time in understanding and applying the graphic information to real-time ground traffic directives. And in another aspect the granularity of an airport campus representation that may be constructed from a plurality of deployed discrete tag reader 302 or read tag 402 inputs and displayed at 482 is directly proportionate to the number of the readers 302 or tags 402 deployed.

Some monitoring systems 470 may be configured to predict aircraft 305/405 or vehicle 307/407 movement, for example analyzing current speed and direction determinations and optionally other data such as historical campus traffic, and thereby determine possible collision events: thus in one embodiment the graphic display 484 may indicate a warning message or other visual indication (for example, flashing icons representing apparatuses of concern) that the monitoring system 470 has determined that one or more apparatuses are likely to collide unless preventative measures are taken.

The monitoring system 470 may also be configured to analyze observed aircraft and vehicle positioning and current and/or predicted movement and provide traffic control recommendations to a ground traffic controller, pilot and/or vehicle operator order to optimize traffic flow control, traffic routing, and congestion prevention. In some applications the monitoring system 470 may be configured to also consider and analyze historical campus traffic information and propose alternative airport traffic planning and airport ground traffic area layout reconfigurations The monitoring system 470 may also be configured to use artificial intelligence logic components to provide fully automated ground traffic routing decisions and directions to airport traffic controllers, thus enabled to assume the task of directing ground traffic. In such a system automated instructions may be directly communicated to pilots and vehicle operators (for example, “Aircraft No. 723 proceed forward on taxiway 7 after Aircraft No. 539 at approximately 20 kilometers per hour”). This application frees human airport traffic control operators from routine and attention-consuming ground traffic management tasks, providing advantages in reducing attention demands on human controllers and thus better enabling them to monitor and overseeing the “big picture” of overall ground traffic conditions, as well as to better focus on and notice exceptional or changing conditions, such as changing weather conditions.

The monitoring system 470 may also be configured to automatically direct aircraft 305 and vehicle 307 movement through interface with on-board autopilot systems, wherein ground autopilot components may be configured to responsively operate each aircraft 305 or vehicle 307, and wherein the role of a pilot or vehicle operator would be as a supervisor to confirm that the guided movements are appropriate. In some embodiments the system 470 may fully interface with a hands-off auto-pilot routing system 480, thereby enabling automated control of movement of apparatuses throughout an airport campus, for example to a point of take-off or a terminal gate wherein a pilot may then assume manual control. And in some examples procedures and components are provided for allowing a pilot or vehicle operator to override autopilot functions when necessary.

II. Computerized Implementation

Figure 7:
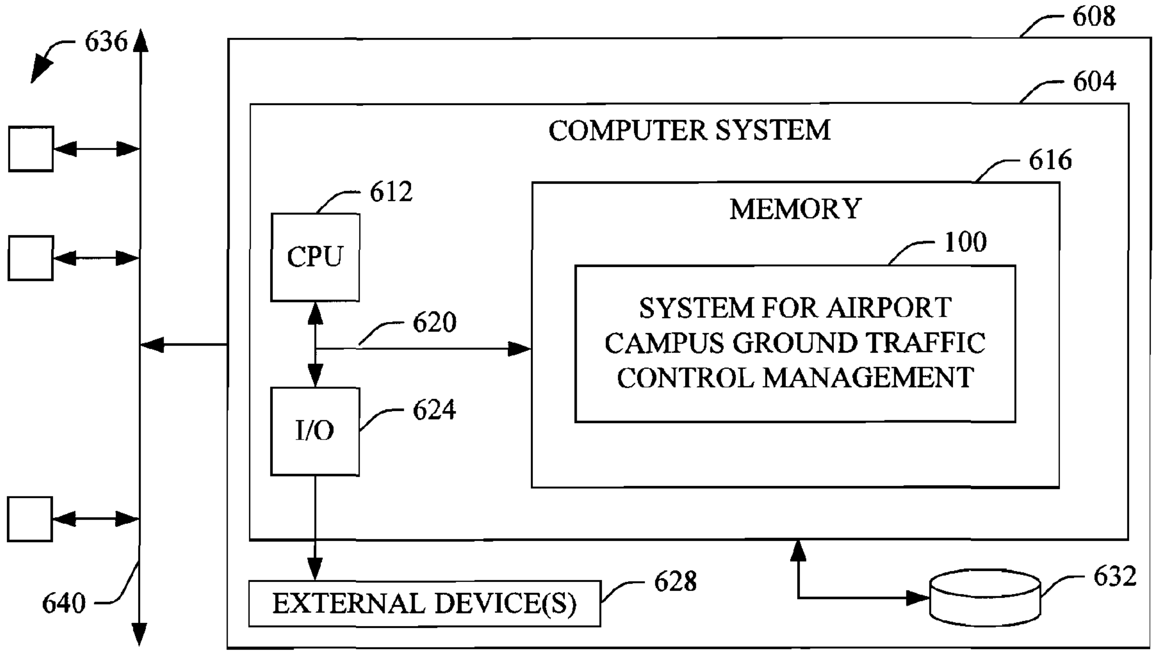
FIG. 7 illustrates an exemplary computerized implementation of a system and process for managing airport campus ground traffic.

Referring now to FIG. 7, an exemplary computerized implementation includes a computer system 604 deployed within a network computer infrastructure 608. This is intended to demonstrate, among other things, that the present invention could be implemented within a network environment 640 (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 608 is intended to demonstrate that some or all of the components of implementation could be deployed, managed, serviced, etc. by a service provider who offers to implement, deploy, and/or perform the functions of the present invention for others.

As shown, the computer system 604 includes a processing unit 612, a memory 616, a bus 620, and input/output (I/O) interfaces 624. Further, the computer system 604 is shown in communication with external I/O devices/resources 628 and storage system 632. In general, the processing unit 612 executes computer program code, such as the code to implement various components of the methods and systems described above for managing airport campus ground traffic, accessible from the memory 616, external devices 628, storage devices 632 or the network environment 640, and which may be stored in the memory 616 and/or the storage system 632. It is to be appreciated that two or more, including all, of these components may be implemented as a single component.

While executing computer program code, the processing unit 612 can read and/or write data to/from the memory 616, the storage system 632, and/or the I/O interfaces 624. The bus 620 provides a communication link between each of the components in computer system 604. The external devices 628 can comprise any devices (e.g., keyboard, pointing device, display, etc.) that enable a user to interact with computer system 604 and/or any devices (e.g., network card, modem, etc.) that enable computer system 604 to communicate with one or more other computing devices.

The computer infrastructure 608 is only illustrative of various types of computer infrastructures for implementing the invention. For example, in one embodiment, computer infrastructure 608 comprises two or more computing devices (e.g., a server cluster) that communicate over a network to perform the various process steps of the invention. Moreover, computer system 604 is only representative of various possible computer systems that can include numerous combinations of hardware.

To this extent, in other embodiments, computer system 604 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively.

Moreover, the processing unit 612 may comprise a single processing unit, or be distributed across one or more processing units in one or more locations, e.g., on a client and server. Similarly, the memory 616 and/or the storage system 632 can comprise any combination of various types of data storage and/or transmission media that reside at one or more physical locations.

Further, I/O interfaces 624 can comprise any system for exchanging information with one or more of the external device 628. Still further, it is understood that one or more additional components (e.g., system software, math co-processing unit, etc.) not shown in FIG. 7 can be included in computer system 604. However, if computer system 604 comprises a handheld device or the like, it is understood that one or more of the external devices 628 (e.g., a display) and/or the storage system 632 could be contained within computer system 604, not externally as shown.

The storage system 632 can be any type of system (e.g., a database) capable of providing storage for information under the present invention. To this extent, the storage system 632 could include one or more storage devices, such as a magnetic disk drive or an optical disk drive. In another embodiment, the storage system 632 includes data distributed across, for example, a local area network (LAN), wide area network (WAN) or a storage area network (SAN) (not shown). In addition, although not shown, additional components, such as cache memory, communication systems, system software, etc., may be incorporated into computer system 604. Shown in the memory 616 of computer system 604 is a process and system 100 for managing airport campus ground traffic configured to perform functions illustrated in FIG. 1 and discussed above.

While shown and described herein as a method and a system, it is understood that the invention further provides various alternative embodiments. For example, in one embodiment, the invention provides a computer-readable/useable medium that includes computer program code to enable a computer infrastructure for managing airport campus ground traffic. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 616 and/or the storage system 632 (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage airport campus ground traffic. In this case, the service provider can create, maintain, support, etc., a computer infrastructure, such as the computer infrastructure 608 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing airport campus ground traffic. In this case, a computer infrastructure, such as computer infrastructure 608, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 604, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for managing ground traffic in an airport, comprising:

receiving read tag data from a plurality of scanning tag readers and determining in real-time airport campus locations for each of a plurality of apparatuses traveling through the airport campus from the read tag data via a traffic manager in communication with the plurality of scanning tag readers, wherein the read tag data is generated by the each of the tag readers individually scanning tags located within their respective tag reader scanning distances in response to the each of the traveling apparatuses bringing:

an attached tag reader proximate to one of a spaced plurality of the tags within the tag reader scanning distance, wherein each of the spaced plurality of tags are distributed throughout the airport campus and spaced from adjacent others of the tags at least a spacing distance greater than the tag reader scanning distance; or an attached one of the tags proximate to one of a spaced plurality of the tag readers within the tag reader scanning distance, wherein each of the spaced plurality of tag readers are distributed throughout the airport campus and spaced from adjacent others of the tag readers at least a spacing distance greater than the tag reader scanning distance;

plotting the determined airport campus locations of each of the apparatuses in real-time onto a graphic depiction presentation of the airport campus via the traffic manager; and providing the graphic depiction presentation to an apparatus operator or an airport ground traffic controller via the traffic manager.

2. The method of claim 1, wherein the plotting the determined airport campus locations of the apparatuses in real-time onto the graphic depiction presentation of the airport campus comprises:

constructing a navigational map of the airport campus comprising a plurality of campus location points, each point correlated to at least one of the distributed plurality of tags or the distributed plurality of tag readers; and plotting each of the apparatus locations on the navigational map.

3. The method of claim 2, further comprising:

determining a current speed and direction of a first apparatus of the apparatuses in real-time by comparing an input from the one tag within the tag reader scanning distance to historic data read from the one tag, or to other tag data read from another of the tags.

4. The method of claim 3, further comprising:

issuing a unique directive to the apparatus operator or the airport ground traffic controller in response to unique tag data read from the one tag by the tag reader proximate to the one tag within the tag reader scanning distance, wherein the issuing the unique directive is via the traffic manager, and wherein the unique tag data is different from unique tag data encoded in a tag adjacent to the read first tag or provided by a tag reader attached to another of the apparatuses.

5. The method of claim 4 wherein the tags are RFID tags and the tag readers are RFID tag readers.

6. The method of claim 5, further comprising:

predicting movement of the first apparatus by analyzing the determined current speed and direction and historical campus traffic data;

determining a possible collision event for the first apparatus in response to the determined airport campus location of the first apparatus, the predicted movement, the determined current speed and direction of the first apparatus, and a determined location of another of the apparatuses within the airport campus; and providing a ground traffic control directive to the apparatus operator or the airport ground traffic controller to prevent the possible collision event in response to the determined possible collision event.

7. The method of claim 6 wherein providing the ground traffic control directive comprises entering an apparatus movement directive into an apparatus auto-pilot control component; and further comprising the auto-pilot component causing movement of the auto-pilot apparatus in response to the apparatus movement directive.

8. A method for deploying an application for managing ground traffic in an airport campus, comprising:

providing a computer infrastructure that:

receives tag data individually read from tags located within a tag reader scanning distance from each of a plurality of tag readers;

determines airport campus locations for each of a plurality of apparatuses traveling through the airport campus from the read data;

plots the determined airport campus locations of the apparatuses in real-time onto a graphic depiction presentation of the airport campus; and provides the graphic depiction presentation to an apparatus operator or an airport ground traffic controller;

wherein the read tag data is generated by each of the travelling apparatuses bringing:

an attached one of the tag readers proximate within the tag reader scanning distance to one of a spaced plurality of the tags, wherein the spaced plurality of tags are distributed throughout the airport campus and spaced from adjacent others of the plurality of tags at least a spacing distance greater than the tag reader scanning distance; or an attached one of the tags proximate within the tag reader scanning distance to one of a spaced plurality of tag readers, wherein the spaced tag readers are distributed throughout the airport campus and spaced from adjacent others of the plurality of tag readers at least a spacing distance greater than the tag reader scanning distance.

9. The method of claim 8, wherein the computer infrastructure further plots the determined airport campus locations of the apparatuses in real-time onto the graphic depiction presentation of the airport campus by:

constructing a navigational map of the airport campus comprising a plurality of campus location points, each point correlated to at least one of the distributed plurality of campus tags or the distributed plurality of campus tag readers; and plotting each of the apparatus locations on the navigational map.

10. The method of claim 9, wherein the computer infrastructure further:

determines a current speed and direction of a first apparatus of the apparatuses in real-time by comparing an input from the one tag within the tag reader scanning distance to historic data read from the one tag, or to other tag data read from another of the tags; and issues a unique directive to the apparatus operator or the airport ground traffic controller in response to unique tag data read from one tag by the tag reader proximate to the one tag within the tag reader scanning distance, wherein the unique read tag data is different from unique tag data encoded in a tag adjacent to the read first tag or provided by a tag reader attached to another of the apparatuses.

11. The method of claim 10, wherein the computer infrastructure further:

predicts movement of the first apparatus by analyzing the determined current speed and direction and historical campus traffic data;

determines a possible collision event for the first apparatus in response to the determined airport campus location of the first apparatus, the determined current speed and direction of the first apparatus, the predicted movement and a determined location of another of the apparatuses within the airport campus; and provides a ground traffic control directive to prevent the possible collision event in response to the determined possible collision event.

12. The method of claim 11, wherein the computer infrastructure further enters the ground traffic control directive directly into an apparatus auto-pilot control component.

13. A computer program product for managing ground traffic in an airport, the computer program product comprising:

a computer readable storage medium device; and program code stored in the computer readable storage medium device comprising instructions which, when executed on a computer system, cause the computer system to:

receive tag data read individually from tags located within a tag reader scanning distance from each of a plurality of tag readers;

determine airport campus locations for each of a plurality of apparatuses traveling through the airport campus from the read data;

plot the determined airport campus locations of the apparatuses in real-time onto a graphic depiction presentation of the airport campus; and provide the graphic depiction presentation to an apparatus operator or an airport ground traffic controller;

wherein the read tag data is generated by the travelling apparatuses bringing:

an attached one of the tag readers proximate within the tag reader scanning distance to one of a spaced plurality of tags, wherein the spaced tags are distributed throughout the airport campus and spaced from adjacent others of the plurality of tags at least a spacing distance greater than the tag reader scanning distance; or an attached one of the tags proximate within the tag reader scanning distance to one of a spaced plurality of tag readers, wherein the spaced tag readers are distributed throughout the airport campus and spaced from adjacent others of the plurality of tag readers at least a spacing distance greater than the tag reader scanning distance.

14. The computer program product of claim 13, wherein the program code instructions, when executed on the computer system, further cause the computer system to plot the determined airport campus locations of the apparatuses in real-time onto the graphic depiction presentation of the airport campus by:

constructing a navigational map of the airport campus comprising a plurality of campus location points, each point correlated to at least one of the distributed plurality of tags or the distributed plurality of tag readers; and plotting each of the apparatus locations on the navigational map.

15. The computer program product of claim 14, wherein the program code instructions, when executed on the computer system, further cause the computer system to:

determine a current speed and direction of a first apparatus of the apparatuses in real-time by comparing an input from the one tag within the tag reader scanning distance to historic data read from the one tag, or to other tag data read from another of the tags.

16. The computer program product of claim 15, wherein the program code instructions, when executed on the computer system, further cause the computer system to:

predict movement of the first apparatus by analyzing the determined current speed and direction and historical campus traffic data;

determine a possible collision event for the first apparatus in response to the determined airport campus location of the first apparatus, the predicted movement, the determined current speed and direction of the first apparatus and a determined location of another of the apparatuses within the airport campus; and provide a ground traffic control directive to the apparatus operator or the airport ground traffic controller to prevent the possible collision event in response to the determined possible collision event.

17. The computer program product of claim 16, wherein the ground traffic control directive is an apparatus movement directive; and wherein the program code instructions, when executed on the computer system, further cause the computer system to enter the apparatus movement directive directly into an apparatus auto-pilot control component.

18. A system, comprising:

a processing unit;

a computer readable memory in communication with the processing unit; and a computer readable storage system in communication with the processing unit, wherein program instructions are stored on the computer readable storage system for execution by the processing unit via the computer readable memory that cause the processing unit to:

receive tag data read individually from tags located within a tag reader scanning distance from each of a plurality of tag readers that are in communication with the processing unit;

determine airport campus locations for each of a plurality of apparatuses traveling through the airport campus from the data read from the tags located within the tag reader scanning distance from the tag readers;

plot the determined airport campus locations of the apparatuses in real-time onto a graphic depiction presentation of the airport campus; and provide the graphic depiction presentation to an apparatus operator or an airport ground traffic controller; and wherein the read tag data is generated by the travelling apparatuses bringing:

an attached one of the tag readers proximate within the tag reader scanning distance to one of a spaced plurality of tags, wherein the spaced tags are distributed throughout the airport campus and spaced from adjacent others of the plurality of tags at least a spacing distance greater than the scanning distance; and an attached one of the tags proximate within the tag reader scanning distance to one of a spaced plurality of tag readers, wherein the spaced tag readers are distributed throughout the airport campus and spaced from adjacent others of the plurality of tag readers at least a spacing distance greater than the scanning distance.

19. The system of claim 18, wherein the processing unit further plots the determined airport campus locations of the apparatuses in real-time onto the graphic depiction presentation of the airport campus by:

constructing a navigational map of the airport campus comprising a plurality of campus location points, each point correlated to at least one of the distributed plurality of tags or the distributed plurality of tag readers; and plotting each of the apparatus locations on the navigational map.

20. The system of claim 19 wherein the tags are RFID tags, and wherein the tag readers are RFID tag readers.

21. The system of claim 20, wherein the processing unit further:

determines a current speed and direction of a first apparatus of the apparatuses in real-time by comparing an input from the one tag within the tag reader scanning distance to historic data read from the one tag, or to other tag data read from another of the tags;

predicts movement of the first apparatus by analyzing the determined current speed and direction and historical campus traffic data;

determines a possible collision event for the first apparatus in response to the determined airport campus location of the first apparatus, the predicted movement, the determined current speed and direction of the first apparatus and a determined location of another of the apparatuses within the airport campus; and provides a ground traffic control directive to prevent the possible collision event in response to the determined possible collision event.

22. The system of claim 21, wherein the ground traffic control directive is an apparatus movement directive; and wherein the processing unit further enters the apparatus movement directive directly into an apparatus auto-pilot control component.

* * * * *